US009662753B1

United States Patent
Kloeppel et al.

(10) Patent No.: US 9,662,753 B1
(45) Date of Patent: May 30, 2017

(54) DISK DRIVE SPINDLE WITH FLUID JOURNAL BEARING HAVING INCREASED RADIAL CLEARANCE IN AXIAL END REGIONS

(71) Applicant: Western Digital Technologies, Inc., Irvine, CA (US)

(72) Inventors: Klaus Kloeppel, Royal Oaks, CA (US); Ronald G. Ilagan, Santa Clara, CA (US); Diep L. Nguyen, Castro Valley, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 210 days.

(21) Appl. No.: 14/287,496

(22) Filed: May 27, 2014

Related U.S. Application Data (60) Provisional application No. 61/950,686, filed on Mar. 10, 2014.

(51) Int. Cl.
*B23P 15/00* (2006.01)
*F16C 43/02* (2006.01)
*F16C 17/10* (2006.01)

(52) U.S. Cl.
CPC .......... *B23P 15/003* (2013.01); *F16C 17/105* (2013.01); *F16C 43/02* (2013.01)

(58) Field of Classification Search
CPC ....... B23P 15/003; F16C 43/02; F16C 17/105
See application file for complete search history.

(56) References Cited

U.S. PATENT DOCUMENTS

| 5,235,482 A | 8/1993 | Schmitz |
| 5,938,124 A | 8/1999 | Lowi, Jr. |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |

(Continued)

FOREIGN PATENT DOCUMENTS

DE    102010022340    12/2011

OTHER PUBLICATIONS

Hendriks, Ferdi, "The oil-air interface problem of fluid dynamic bearings in hard disk drives," Presented at MPI 2005 WPI Worcester, MA dated Jun. 13-17, 2005, Hitachi Global Storage Technologies, pp. 1-27.

*Primary Examiner* — Richard Chang (57) ABSTRACT

A method to fabricate a fluid bearing spindle includes creating a hollow cylindrical bore through a solid workpiece. The hollow cylindrical bore has a journal bearing portion including first and second distal tapered bearing segments separated by a central bearing segment having a constant radius. Each of the first and second distal tapered bearing segments has a tapered bearing radius that increases with distance from the central bearing segment to a maximum tapered bearing radius that is in the range of 0.5 microns to 1.5 microns greater than the constant radius. Subsequently, a cylindrical spindle shaft is inserted into the hollow cylindrical bore. In an alternative embodiment, a cylindrical outer surface of the spindle shaft includes the tapered bearing segments, rather than the hollow cylindrical bore.

9 Claims, 5 Drawing Sheets

(56) References Cited

U.S. PATENT DOCUMENTS

| | | |
|---|---|---|
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Knoth |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,544,403 B2 * | 4/2003 | Usui .................. B23H 1/04 205/666 |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,943,985 B2 | 9/2005 | Kull et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,059,052 B2 * | 6/2006 | Okamura ............ F16C 17/026 29/898.02 |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |

(56) References Cited

U.S. PATENT DOCUMENTS

| | | |
|---|---|---|
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,380,989 B2 | 6/2008 | Murata et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,120,220 B2 | 2/2012 | Yamashita et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,177,434 B2 | 5/2012 | Ito et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,284,515 B2 | 10/2012 | Sekii et al. |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |

(56) References Cited

U.S. PATENT DOCUMENTS

| | | |
|---|---|---|
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2011/0212281 A1 | 9/2011 | Jacoby et al. |
| 2012/0237148 A1 | 9/2012 | Niwa et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

DISK DRIVE SPINDLE WITH FLUID JOURNAL BEARING HAVING INCREASED RADIAL CLEARANCE IN AXIAL END REGIONS

CROSS REFERENCE TO RELATED APPLICATION

This application claims priority to provisional U.S. Patent Application Ser. No. 61/950,686, filed on Mar. 10, 2014, which is incorporated herein in its entirety.

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. Magnetic hard disk drives typically store information on non-removable rigid magnetic disks. There are also optical disk drives, which typically retrieve information stored on removable optical disk media. Also for example, there are magneto-optical disk drives, which share some of the characteristics of optical disk drives and magnetic hard disk drives.

All types of disk drives typically include a spindle motor that supports and spins at least one disk media. Although past disk drive spindle motors utilized ball bearings, ball bearings have been replaced by fluid bearings in many contemporary disk drive spindle motors, for example to reduce non-repeatable runout, vibration, and/or acoustic noise.

A disk drive that is installed in a mobile device such as a laptop computer is often subjected to angular displacements during operation, which can cause the spindle fluid bearing to be subjected to gyration-induced torques. Such gyration-induced torques can undesirably increase the operation noise of the disk drive spindle, and can also accelerate surface wear within the fluid bearing.

Therefore, there is a need in the art for an improved fluid bearing for a disk drive spindle motor that is more robust to gyration-induced torques, while still providing acceptable bearing pressure and stiffness to meet contemporary specifications, and that can be practically mass-manufactured at acceptably low cost.

DETAILED DESCRIPTION OF EXAMPLE EMBODIMENTS

Figure 1:
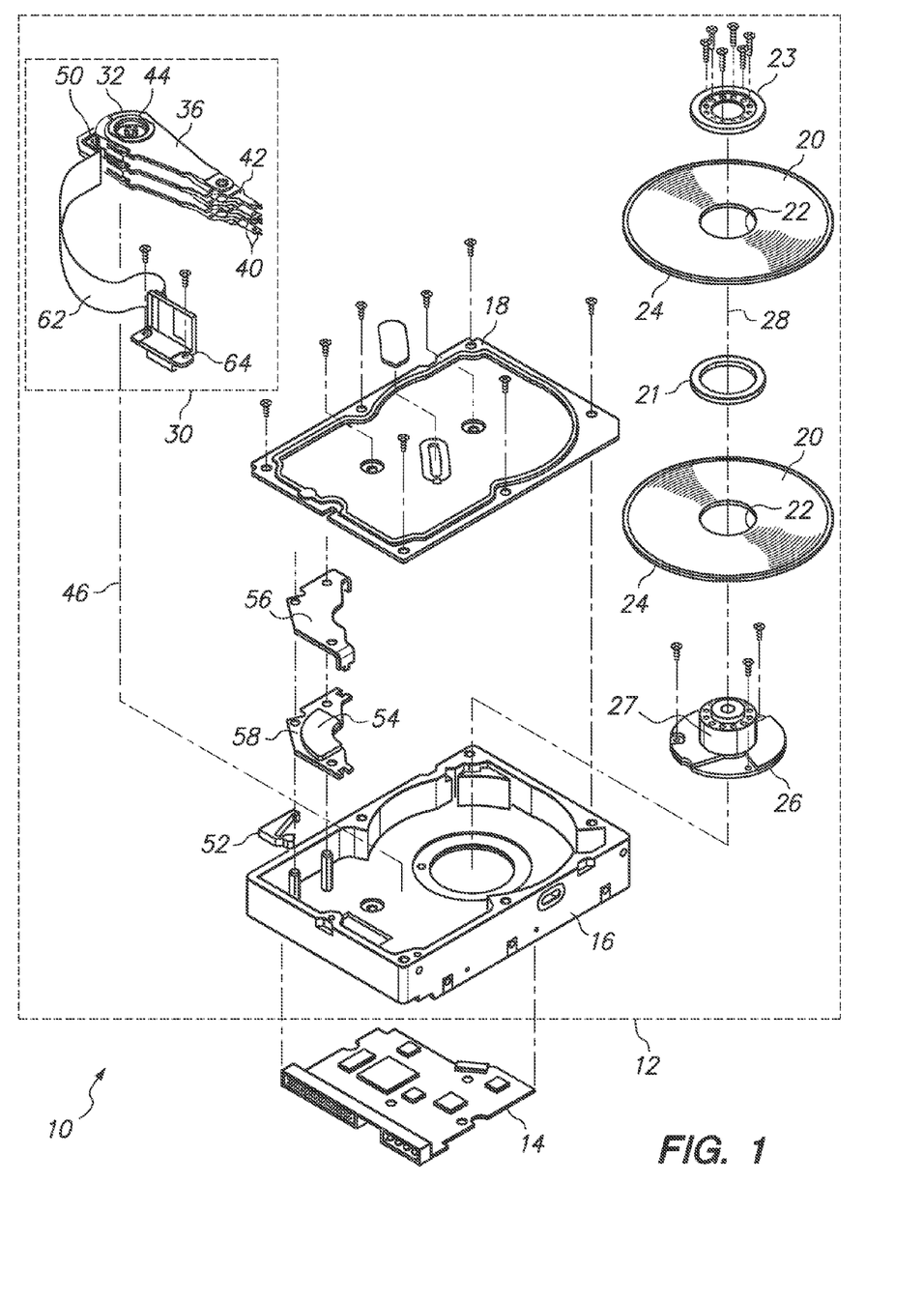
FIG. 1 is an exploded perspective view of a disk drive capable of including a fluid bearing spindle fabricated by a method according to an embodiment of the present invention.

FIG. 1 is an exploded perspective view of a disk drive 10 capable of including a fluid bearing spindle fabricated by a method according to an embodiment of the present invention. The disk drive 10 includes a head disk assembly (HDA) 12 and a printed circuit board assembly (PCBA) 14. The HDA 12 includes a disk drive base 16 and cover 18 that together house disks 20. Each of the disks 20 may contain a plurality of concentric tracks for storing data, disposed upon its opposing disk major surfaces between an inner radial extent 22 and an outer radial extent 24.

In the embodiment of FIG. 1, the head disk assembly 12 further includes a rotary spindle 26 for rotating the disks 20 about a disk axis of rotation 28. The rotary spindle 26 is attached to the disk drive base 16 of the HDA 12, and may include a rotatable hub 27 upon which the disks 20 may be mounted. The disks 20 may be stacked and separated with one or more annular disk spacers 21, and clamped to the rotary spindle hub 27 by a disk clamp 23.

In the embodiment of FIG. 1, the HDA 12 further includes a head stack assembly (HSA) 30 pivotably attached to the disk drive base 16 of HDA 12. Specifically, the HSA 30 may be pivotably attached to the disk drive base 16 by use of a pivot bearing cartridge 44 that is engaged within a bore of an actuator body 32, and which pivot bearing cartridge 44 is attached to the disk drive base 16. The pivot bearing cartridge 44 may facilitate the HSA 30 to rotate relative to HDA 12 about an actuator pivot axis 46.

One or more actuator arms 36 may extend from the actuator body 32, and one or more head gimbal assemblies (HGA) 42 may be attached to a distal end of each actuator arm 36. Each HGA 42 may include a head 40 for reading and writing data from and to an adjacent disk surface. The HSA 30 may further include a coil 50. The coil 50 may interact with one or more magnets 54 attached to disk drive base 16 via a yoke structure 56, 58, to form a voice coil motor for controllably rotating the HSA 30. The HDA 12 also optionally includes a latch 52 pivotably mounted on the disk drive base 16 to limit the rotational movement of the HSA 30.

In the embodiment of FIG. 1, the PCBA 14 may include a servo control system for generating servo control signals to control the current through the coil 50 and thereby position the HSA 30 relative to concentric tracks disposed upon the surfaces of disks 20. The HSA 30 may be electrically connected to PCBA 14 via a flex cable 62 and a flex cable support bracket 64 that attaches to the disk drive base 16.

Figure 2:
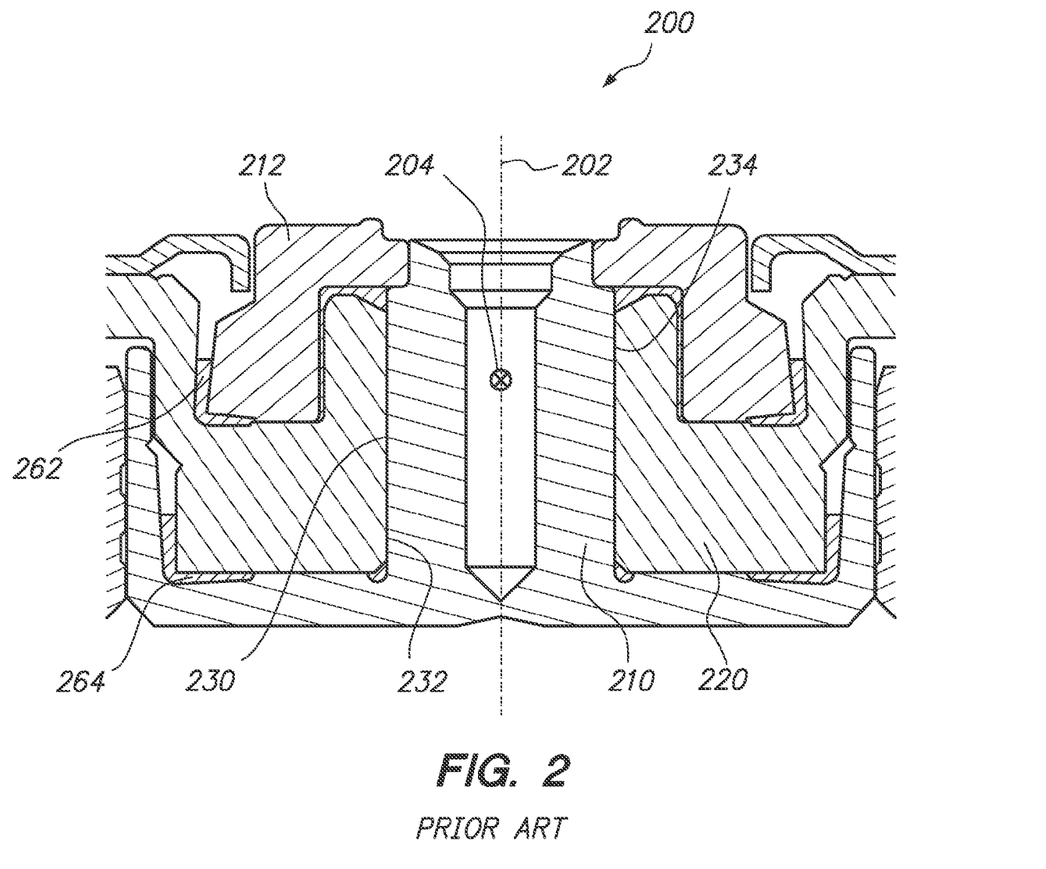
FIG. 2 is a partial cross-sectional view of a contemporary disk drive spindle.

FIG. 2 is a partial cross-sectional view of a contemporary disk drive spindle 200. The contemporary disk drive spindle 200 includes a rotating member 220 that rotates relative to a fixed member 210, 212, about a spindle motor rotational axis 202. A fluid bearing 230 supports the rotating member 220 during operation. The fluid bearing 230 may be in fluid communication with one or more fluid reservoirs 262, 264 that store fluid in a clearance that is too great for the fluid reservoirs 262, 264 to develop significant bearing pressure. Therefore, the fluid reservoirs 262, 264 do not function as bearing portions or carry any significant bearing load.

Suppose that the fixed member 210, 212 is tilted (clockwise in the view of FIG. 2) about the spindle center of gravity 204, during disk drive operation. The rotating member (e.g. hub) 220 would resist such tilt by a gyroscopic moment that would result in increased pressure, bearing surface contact, wear, and associated noise emission, at the axial endpoint regions 232 and 234 of the journal of the fluid bearing 230. Certain embodiments disclosed herein may improve fluid bearing robustness to such a gyroscopic moment.

Figure 3:
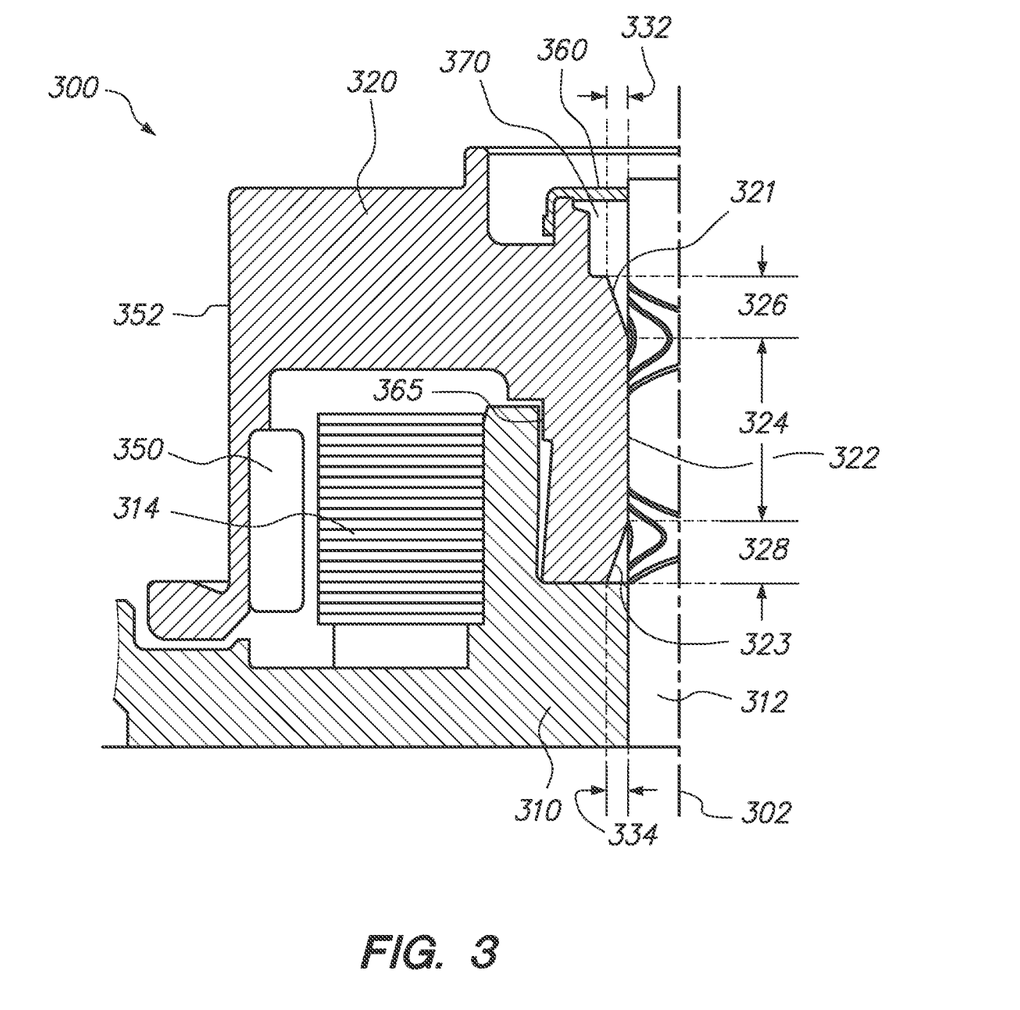
FIG. 3 is a partial cross-sectional view of a spindle according to an example embodiment of the present invention.

FIG. 3 is a partial cross-sectional view of a spindle 300 according to an example embodiment of the present invention. Specifically, in FIG. 3 only the left half of the spindle 300 is shown, with the axis of spindle rotation 302 being a line of symmetry about which the right half would be a mirror image. The spindle 300 includes a rotatable spindle hub 320 having a cylindrical bore 370 in which a cylindrical spindle shaft 312 is inserted. Fabrication of the rotatable spindle hub 320 may include creating the hollow cylindrical bore 370 through a solid workpiece (e.g. a series 4000 stainless steel workpiece). In the present context, "cylindrical" does not imply constant radius along an entire axial length. Rather, herein, a cylinder having a radius that varies along its axial length is still considered to be a "cylinder."

A fluid bearing is formed between the hollow cylindrical bore 370 and the cylindrical spindle shaft 312. Such fluid bearing may be pressurized by rotation and optional grooves formed in the outer surface of the cylindrical spindle shaft 312. Specifically, the hollow cylindrical bore has a journal bearing portion 321, 322, 323 that has a fluid filled radial clearance in the range 1.5 microns to 5 microns. Larger radial clearances would not develop sufficient fluid bearing pressure to function as a bearing and support a bearing load at typical spindle rotational speeds. As shown in FIG. 3, at some axial locations the journal bearing portion 321, 322, 323 includes a pattern of fluid pumping grooves to assist with bearing pressurization.

In the embodiment of FIG. 3, the cylindrical spindle shaft 312 may be supported by a fixed member 310 that does not rotate with the rotatable spindle hub 320. The fixed member 310 may also support one or more stator coils 314 that act as an electromagnet. The stator coils 314 interact with at least one permanent magnet 350 attached to the spindle hub 320, to apply a torque to the spindle hub 320 and thereby induce its rotation. The rotation of the rotatable hub 320, in turn, rotates any disks that are mounted on its outside surface 352.

In the embodiment of FIG. 3, the hollow cylindrical bore 370 defines the spindle axis of rotation 302 and is concentric about the spindle axis of rotation 302. The spindle 300 may include a bearing cap 360 to reduce the passage of contaminates out of or into the hollow cylindrical bore 370. The hollow cylindrical bore 370 has a journal bearing portion 321, 322, 323 that includes first and second distal tapered bearing segments 321, 323, and a central bearing segment 322 disposed axially adjacent to and between the first and second distal tapered bearing segments 321, 323. The central bearing segment 322 may have a constant radius along a central bearing segment axial extent 324. In this context, a "segment" is just an axial portion of the cylindrical bore 370, which can be monolithic with, a single piece with, and materially contiguous with other segments of the cylindrical bore 370 (i.e. distinguishable segments do not necessarily imply an assembly of subcomponents).

In the embodiment of FIG. 3, the first distal tapered bearing segment 321 may have a tapered bearing segment axial extent 326, and a tapered bearing radius that increases with distance from the central bearing segment 322 along the tapered bearing segment axial extent 326 to a maximum tapered bearing radius 332 that may preferably be in the range of 0.5 microns to 1.5 microns greater than the constant radius. In certain embodiments, the tapered bearing segment axial extent 326 may preferably be in the range of 0.7 mm to 1.3 mm. Note that the taper angle of the first distal tapered bearing segment 321 is greatly exaggerated in the view of FIG. 3, so that it can be easily identified.

In the embodiment of FIG. 3, the second distal tapered bearing segment 323 may have a tapered bearing segment axial extent 328, and a tapered bearing radius that likewise increases with distance from the central bearing segment 322 along the tapered bearing segment axial extent 328 to a maximum tapered bearing radius 334 that may preferably be in the range of 0.5 microns to 1.5 microns greater than the constant radius. In certain embodiments, the tapered bearing segment axial extent 328 may preferably be in the range of 0.7 mm to 1.3 mm. Note that the taper angle of the second distal tapered bearing segment 323 is greatly exaggerated in the view of FIG. 3, so that it can be easily identified.

In the embodiment of FIG. 3, the journal bearing portion 321, 322, 323 of the hollow cylindrical bore 370 is distinguishable from other fluid filled clearances between the rotating and fixed members, such as fluid reservoir portions (e.g. bearing fluid reservoir 365). That is because the fluid reservoir portions (e.g. bearing fluid reservoir 365) have a substantially larger taper and meniscus, and are characterized by radial clearances that are too great to develop sufficient fluid pressure to function as a bearing (to support a bearing load). For example, the microscopic taper angle of the tapered bearing segments 321, 323 (e.g. 1.5 microns to 5 microns radial clearance change over an axial distance of 0.7 mm to 1.3 mm) prevents the tapered bearing segments 321, 323 from functioning as a fluid reservoir, due to insufficient fluid capacity.

Conversely, the larger taper angle of the fluid reservoir 365 (e.g. 3° to 20°) prevents the fluid reservoir 365 from functioning as a bearing segment, because the radial clearance quickly grows too large within the fluid reservoir 365, for the fluid reservoir 365 to carry any significant bearing load. For example, the tapered fluid reservoir 365 may have an axial extent that is in the range of 200 microns to 1.5 mm, and a maximum fluid reservoir radius that is in the range of 50 to 500 microns greater than the constant radius. In this context, a greater angle is one that deviates more from the spindle axis of rotation regardless of sense, and a lesser angle is one that deviates less from the spindle axis of rotation, regardless of sense. The tapered fluid reservoir 365 may also be partially filled with a gas (e.g. the gas that surrounds the fluid bearing spindle, such as air, helium, nitrogen, argon, etc.), with a meniscus in the tapered fluid reservoir 365 between the bearing lubricant and the gas.

Figure 4:
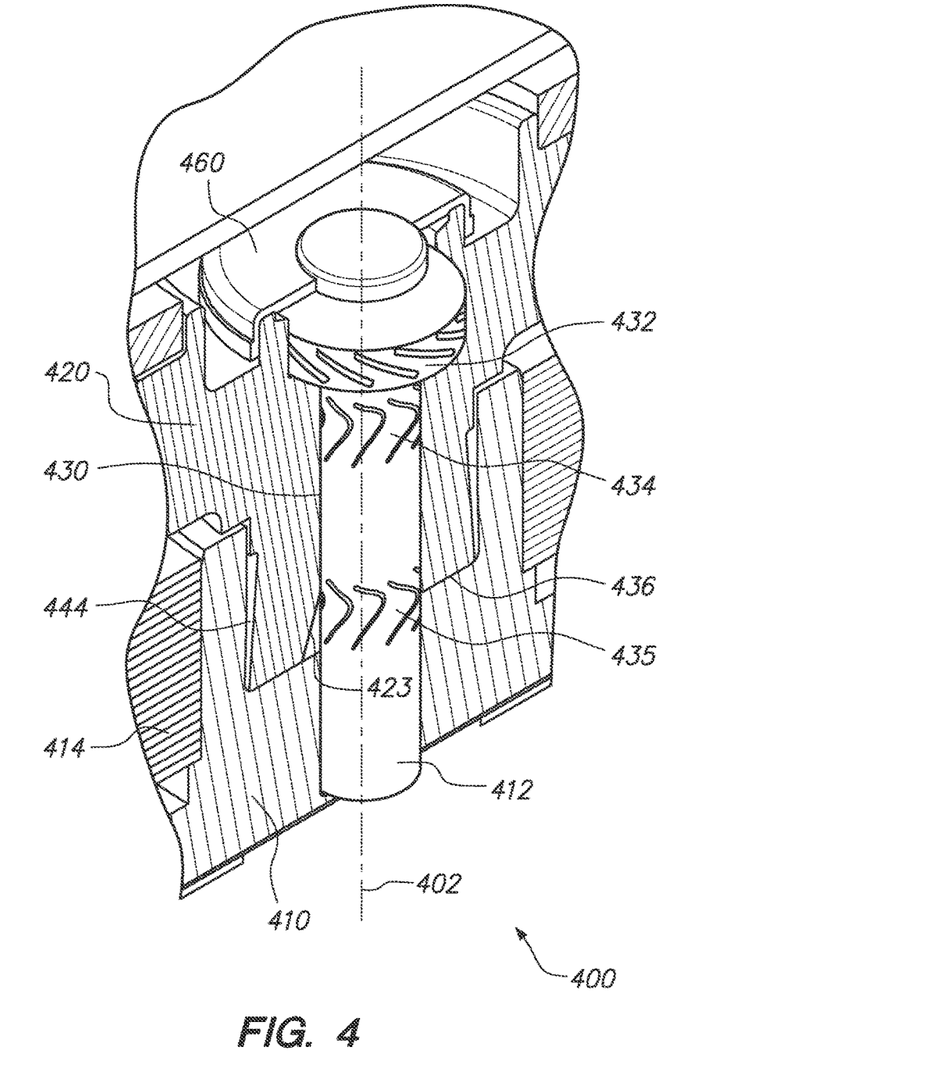
FIG. 4 is a cut away view of a portion of a spindle according to an example embodiment of the present invention.

FIG. 4 is a cut away view of a portion of a spindle 400 according to an example embodiment of the present invention. The spindle 400 includes a rotatable spindle hub 420 having a cylindrical bore into which a cylindrical spindle shaft 412 is inserted. In the present context, "cylindrical" does not imply constant radius along an entire axial length. Rather, herein, a cylinder having a radius that varies along its axial length is still considered to be cylindrical.

A fluid journal bearing having a central bearing segment 430 is formed between the hollow cylindrical bore of the rotatable spindle hub 420 and the cylindrical spindle shaft 412. Such fluid journal bearing may be pressurized by rotation and optional groove patterns 432, 434, and 435 formed in the outer surface of the cylindrical spindle shaft 412. Specifically, the central bearing segment 430 of the fluid journal bearing may have a fluid filled radial clearance in the range 1.5 microns to 5 microns. In this context, the radial clearance is measured at a non-grooved location of the fluid journal bearing 430 (i.e. does not include the groove depth). Larger radial clearances would not develop sufficient fluid bearing pressure to function as a bearing and support a bearing load at typical spindle rotational speeds.

In the embodiment of FIG. 4, the cylindrical spindle shaft 412 may be supported by a fixed member 410 that does not rotate with the rotatable hub 420. The fixed member 410 may also support one or more stator coils 414 that can apply a torque to the spindle hub 420 to induce its rotation. The spindle hub 420 may include a thrust bearing surface 436 to support axial loads.

In the embodiment of FIG. 4, the hollow cylindrical bore of the spindle hub 420 (and the cylindrical spindle shaft 412 within) is concentric about the spindle axis of rotation 402. The spindle 400 may include a bearing cap 460 to reduce the passage of contaminates out of or into the hollow cylindrical bore of the spindle hub 420. The journal bearing of the hollow cylindrical bore of the spindle hub 420 also has a distal tapered bearing segment 423 that is axially adjacent the central journal bearing segment 430.

In the embodiment of FIG. 4, the distal tapered bearing segment 423 may have a tapered bearing radius that increases with distance from the central bearing segment 430 to a maximum tapered bearing radius that may preferably be in the range of 0.5 microns to 1.5 microns greater than the constant radius of the central bearing segment 430. In certain embodiments, the tapered bearing segment 423 may have an axial extent that is preferably in the range of 0.7 mm to 1.3 mm. Note that the taper angle of the distal tapered bearing segment 423 is greatly exaggerated in the view of FIG. 4, so that it can be easily identified.

In the embodiment of FIG. 4, the central and tapered segments 430, 423 of the journal bearing of the rotatable hub 420 are distinguishable from other fluid filled clearances between the rotating and fixed members, such as the tapered fluid reservoir 444. That is because the tapered fluid reservoir 444 has a substantially larger taper and meniscus, and is characterized by radial clearances that are too great to develop sufficient fluid pressure to function as a bearing (to support a bearing load). For example, the microscopic taper angle of the tapered bearing segment 423 (e.g. 1.5 microns to 5 microns radial clearance change over an axial distance of 0.7 mm to 1.3 mm) prevents the tapered bearing segment 423 from functioning as a fluid reservoir, due to insufficient fluid capacity.

Conversely, the larger taper angle of the fluid reservoir 444 (e.g. 3° to 20°) prevents the fluid reservoir 444 from functioning as a bearing segment, because the radial clearance quickly grows too large within the fluid reservoir 444, for the fluid reservoir 444 to carry any significant bearing load. For example, the tapered fluid reservoir 444 may have an axial extent that is in the range of 200 microns to 1.5 mm, and a maximum fluid reservoir radius that is in the range of 50 to 500 microns greater than the constant radius.

Figure 5:
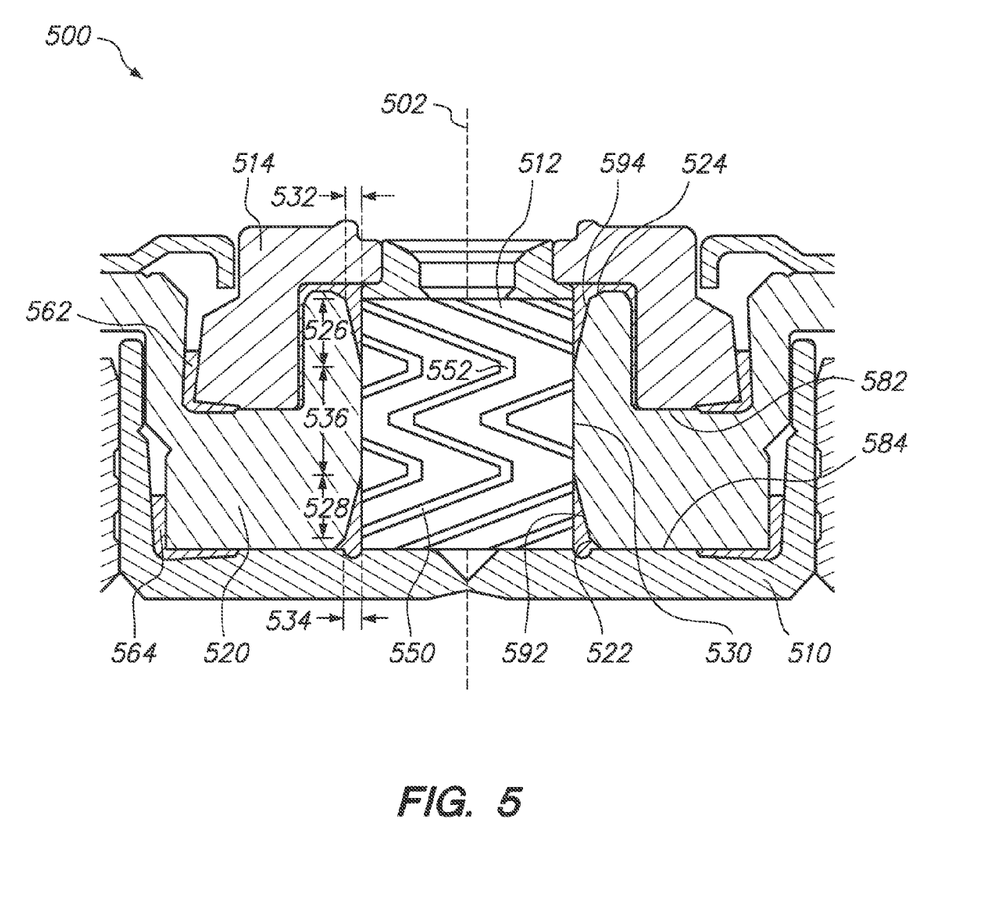
FIG. 5 is a cut away view of a spindle according to an example embodiment of the present invention.

FIG. 5 is a cut away view of a spindle 500 according to an example embodiment of the present invention. The spindle 500 includes a rotating member 520 that rotates relative to a fixed member 510, 512, 514, about a spindle motor rotational axis 502. A fluid bearing supports the rotating member 520 during operation. The fluid bearing includes grooves 550 (e.g. in a herringbone pattern) on a bearing surface of either the rotating member 520 or the fixed member 512. Note that the bearing surfaces of the rotating member 520 and the fixed member 512 are characterized by their facing each other, separated by a very small fluid-filled clearance (e.g. 1.5 to 5 microns at non-groove locations) in which the grooves are able to pump and pressurize the fluid in the fluid-filled clearance.

In FIG. 5, the pumping grooves 550 are depicted as being etched into the outer cylindrical surface of the fixed member 512. However, in certain alternative embodiments, the grooves are etched instead into the interior surface of the hollow cylindrical bore of the rotating member 520, with the cylindrical outer surface of the fixed member 512 being preferably but not necessarily grooveless. Based on the present description, one of ordinary skill would have no difficulty in envisaging the grooves 550 shown in FIG. 5 being disposed on the interior cylindrical surface of the rotating member 520, rather than the outer surface of the fixed member 512.

In the embodiment of FIG. 5, the "thrust" bearing surfaces 582, 584 (that support axial loads) are depicted horizontally in FIG. 5, and include a fluid-filled clearance that is generally horizontal in FIG. 5 (and shaped as a disk that extends radially away from the spindle rotation axis 502). The so-called "journal" bearing surfaces (that support radial loads), face each other, separated by a fluid-filled clearance that is generally shaped as a cylinder that surrounds and extends parallel to the spindle rotation axis 502 (vertically in FIG. 5). The grooves 550 shown in FIG. 5 pertain to a journal bearing surface of the fluid bearing of the disk drive spindle 500.

Note that in FIG. 5, the vertical direction does not refer to any particular direction with respect to gravity. Rather the vertical direction in FIG. 5 is a direction that is parallel to the spindle motor rotational axis 502. The radial direction extends normally from the spindle motor rotational axis 502, and is horizontal in the view of FIG. 5.

In the embodiment of FIG. 5, the journal bearing surface of the rotating member 520 includes a central portion 530, a lower tapered portion 592, and an upper tapered portion 594. The taper angle of portions 592 and 594 of the journal bearing surface is greatly exaggerated so as to be visible in FIG. 5, but is actually a very shallow angle (a small fraction of 1°). For example, the upper tapered portion 594 has a taper length 526 that may preferably be in the range 0.7 mm to 1.3 mm, and a taper amount 532 (the maximum increased radial clearance relative to that of the central portion 530) that may preferably be in the range 0.5 microns to 1.5 microns.

Likewise, the lower tapered portion 592 may have a taper length 528 that may preferably be in the range 0.7 mm to 1.3 mm, and a taper amount 534 (the maximum increased radial clearance relative to that of the central portion 530) that may preferably be in the range 0.5 microns to 1.5 microns. The central portion 530 of the journal bearing surface may have an axial extent 536 characterized by a constant radial clearance in the range 1.5 to 5 microns at non-groove locations.

Referring again to the embodiment of FIG. 5, there are also fluid reservoir tapered regions 522, 524 disposed outside but axially adjacent to the tapered journal bearing surfaces 592 and 594. The taper angles of the fluid reservoir tapered regions 522, 524 are much larger, for example, in the range of 3° to 20°. The reason why the tapered journal bearing surfaces 592 and 594 are far more noticeably tapered is because the purpose of the tapered journal bearing surfaces 592 and 594 is to allow a greater volume of fluid storage for the fluid bearing, and (in some embodiments) accommodate a meniscus between such fluid and the surrounding air. Because the much larger taper rapidly increases the radial clearance between the rotating member 520 and the fixed member 512, moving axially away from the tapered journal bearing surfaces 592 and 594, the fluid reservoir tapered regions 522, 524 do not act as bearing surfaces and do not support bearing loads.

In the embodiment of FIG. 5, the fluid bearing may further be in fluid communication with one or more additional fluid reservoirs 562, 564 that store fluid in a clearance that is too great to develop significant bearing pressure. Therefore, none of the fluid reservoirs 524, 562, 522, and 564 can function as a bearing portions or carry any significant bearing load.

In certain embodiments, the taper length 528 of the lower tapered portion 592 and/or the taper length 526 of the upper tapered portion 594, may preferably correspond to an axial distance between an apex 552 of a groove in the herringbone groove pattern 550, and an axial end of the journal bearing (e.g. where one of the fluid reservoir tapered regions 522, 524 begins). In certain embodiments, such a taper location and length may help facilitate desirable fluid pumping by one or more of the grooves 550.

In certain embodiments, the lower tapered portion 592 and the upper tapered portion 594, although being deliberately machined shallow tapers, may mimic a future worn condition of a conventional fluid bearing. Such shallow tapers may reduce high stress concentration on bearing surfaces, by intentionally designing the wear pattern already into the bearing bore during initial manufacture. In some embodiments this can reduce acoustic noise and wear during operation. The novel fluid bearing may still provide sufficient bearing stiffness with the remaining straight portion of the journal bearing, and adequately discourage sub-ambient pressure conditions in fluid bearing interface areas.

An example process to fabricate a journal bearing sleeve for a fluid bearing spindle according to certain embodiments of the present invention, may include one or more of the following steps listed in the nonexclusive list of steps provided in the following five paragraphs—not necessarily to be performed in the order listed here (this is not a complete list of manufacturing steps, and may include steps that are not necessary for every embodiment):

Mount a solid material (e.g. series 4000 stainless steel) workpiece on a precision lathe.

Drill a bore through the workpiece.

While turning the workpiece on the lathe, traverse a precision tool (e.g. diamond bit) along a bearing region of the internal bore to create a constant diameter bearing surface in a middle section, and to create slightly tapered bearing surfaces of the bore near each axial end. The tapered bearing surfaces may preferably extend over an axial taper length in the range of 0.7 mm to 1.3 mm. The result of this step is to create a slightly larger radius near each axial end—e.g. larger by 0.5 microns to 1.5 microns at an outer axial extent of each axial taper length.

While turning the workpiece on the lathe, traverse a cutting bit along the internal bore to optionally create fluid reservoir tapered regions (outside the bearing region) having a much greater taper angle in the range of 3° to 20°, and a greater diameter than that found in the bearing region.

Optionally create a pattern of grooves in the bearing surfaces in the bearing region of the internal bore. This can be done, for example by inserting an approximately cylindrical electrode into the bore (e.g. with a radial clearance with the bore that is preferably greater than 20 microns). The approximately cylindrical electrode may have an electrically conductive outer surface in locations facing where grooves are desired in the journal sleeve under manufacture, and an electrically insulative outer surface in locations facing where grooves are not desired in the journal sleeve under manufacture.

Note that the approximately cylindrical electrode may optionally have a slightly larger diameter near its axial ends (e.g. to compensate for the increased diameter of the journal bearing sleeve near the axial ends of the bearing region according to certain embodiments of the present invention, and thereby keep the electrode to bearing sleeve spacing substantially constant despite diameter changes along their length—or, alternatively, to over-compensate in that regard, so that the electrode to bearing sleeve spacing is reduced near the axial ends, so that the etched grooves may result as deeper or wider near the axial ends, for example to better pump fluid during spindle operation). For example, the cylindrical electrode tool may have a middle tool segment of constant outer diameter, and increases diameter in first and second tool end segments, with the middle tool segment being disposed axially between the first and second tool end segments.

In certain embodiments, the electrode and journal bearing sleeve under manufacture may be bathed in an electrolytic solution and an electrical current may be passed between the electrode and the journal bearing sleeve under manufacture, for example to create the desired grooves by a electrochemical etching process. In certain embodiments, passing the electrical current may preferably be continued until the pattern of grooves defines a groove depth in the range of 2 microns to 7 microns.

The process to fabricate a shaft for use within a journal bearing sleeve, for a fluid bearing spindle according to certain alternative embodiments of the present invention, may include one or more of the steps listed in the nonexclusive list of steps in the following four paragraphs—not necessarily to be performed in the order listed here (this is not a complete list of manufacturing steps, and may include steps that are not necessary for every embodiment):

Mount a solid material (e.g. series 4000 stainless steel) workpiece on a precision lathe.

While turning the workpiece on the lathe, traverse a precision tool (e.g. diamond bit) along a bearing region of the outside surface to create a constant diameter outer bearing surface in a middle section, and to create slightly tapered bearing surfaces of the outer surface near each axial end. The tapered bearing surfaces may preferably extend over an axial taper length in the range of 0.7 mm to 1.3 mm. The result of this step is to create a slightly smaller radius near each axial end—e.g. smaller by 0.5 microns to 1.5 microns at an outer axial extent of each axial taper length.

While turning the workpiece on the lathe, traverse a cutting bit along the outer surface to optionally create fluid reservoir tapered regions (outside the bearing region) having a much greater taper angle in the range of 3° to 20°, and a smaller diameter than that found in the bearing region.

Optionally create a pattern of grooves in the bearing surfaces in the bearing region of the outer surface. This can be done, for example by inserting the bearing shaft under manufacture into an approximately cylindrical bore of an electrode (e.g. with an approximately 30 micron radial clearance between the bearing shaft under manufacture and the bore of the electrode), the approximately cylindrical bore of the electrode having an electrically conductive inner surface in locations facing where grooves are desired on the bearing shaft under manufacture, and an electrically insulative inner surface in locations facing where grooves are not desired on the bearing shaft under manufacture. Note that the approximately cylindrical bore of the electrode may optionally have a slightly smaller diameter near its axial ends (e.g. to compensate for the decreased diameter of the bearing shaft near the axial ends of the bearing region according to certain embodiments of the present invention, and thereby keep the electrode to bearing shaft spacing constant despite diameter changes along their length—or, alternatively, to over-compensate in that regard, so that the electrode to bearing shaft spacing is reduced near the axial ends, so that the etched grooves may result as deeper or wider near the axial ends, for example to better pump fluid during spindle operation). The electrode and bearing shaft under manufacture may be bathed in an electrolitic solution and an electrical current may be passed between the electrode and the bearing shaft under manufacture, for example to create the desired grooves by electrochemical etching.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A method to fabricate a fluid bearing spindle, the method comprising:
    creating a hollow cylindrical bore through a solid workpiece, the hollow cylindrical bore defining a spindle axis of rotation and being concentric about the spindle axis of rotation, the hollow cylindrical bore having a journal bearing portion including:
        first and second distal tapered bearing segments, and
        a central bearing segment disposed axially adjacent to and between the first and second distal tapered bearing segments,
    wherein the central bearing segment has a constant radius along a central bearing segment axial extent, and each of the first and second distal tapered bearing segments has a tapered bearing segment axial extent and a tapered bearing radius that increases with distance from the central bearing segment along the tapered bearing segment axial extent to a maximum tapered bearing radius that is in a range of 0.5 microns to 1.5 microns greater than the constant radius, the tapered bearing segment axial extent being in a range of 0.7 mm to 1.3 mm, and
    subsequently inserting a cylindrical spindle shaft into the hollow cylindrical bore.

2. The method of claim 1, further comprising creating a pattern of grooves in the journal bearing portion of the hollow cylindrical bore.

3. The method of claim 2, wherein the pattern of grooves extends into the first and second distal tapered bearing segments, and the central bearing segment.

4. The method of claim 3, wherein the pattern of grooves is a herringbone pattern of chevron shaped grooves.

5. The method of claim 4, wherein a first plurality of the chevron shaped grooves each define an apex that is axially coincident with where the first distal tapered bearing segment meets the axially adjacent central bearing segment.

6. The method of claim 2, wherein the radial tool clearance is greater than 20 microns.

7. The method of claim 2, wherein passing the electrical current is continued until the pattern of grooves defines a groove depth in the range of 2 microns to 7 microns.

8. The method of claim 1, wherein a radial bearing clearance between an outer bearing surface of the cylindrical spindle shaft and the journal bearing portion of the hollow cylindrical bore is no greater than 5 microns.

9. The method of claim 8, further comprising completely filling the radial bearing clearance with a bearing lubricant.

* * * * *